United States Patent
Pike et al.

(10) Patent No.: US 9,294,426 B2
(45) Date of Patent: *Mar. 22, 2016

(54) INNER-CIRCLE SOCIAL SOURCING

(71) Applicant: CITIZEN, INC., Portland, OR (US)

(72) Inventors: Sce Pike, Portland, OR (US); Andrew Klonsky, Portland, OR (US); Quinn Simpson, Portland, OR (US); Annette Thurston, Portland, OR (US); George Piper Carr, Portland, OR (US)

(73) Assignee: CITIZEN, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,949

(22) Filed: Feb. 17, 2015

(65) Prior Publication Data
US 2015/0304263 A1 Oct. 22, 2015

Related U.S. Application Data

(63) Continuation of application No. 13/603,817, filed on Sep. 5, 2012, now Pat. No. 8,959,440.

(60) Provisional application No. 61/532,387, filed on Sep. 8, 2011.

(51) Int. Cl.
*G06F 3/00* (2006.01)
*H04L 12/58* (2006.01)

(52) U.S. Cl.
CPC ............. *H04L 51/20* (2013.01); *H04L 51/04* (2013.01); *H04L 51/32* (2013.01); *H04L 51/38* (2013.01)

(58) Field of Classification Search
CPC .................. G06Q 50/01; H04L 51/32
See application file for complete search history.

(56) References Cited

U.S. PATENT DOCUMENTS

| | | | |
|---|---|---|---|
| 2007/0030824 A1* | 2/2007 | Ribaudo et al. | 370/328 |
| 2008/0222127 A1* | 9/2008 | Bergin | 707/5 |
| 2011/0252340 A1* | 10/2011 | Thomas | 715/756 |
| 2012/0323909 A1* | 12/2012 | Behforooz et al. | 707/728 |

* cited by examiner

*Primary Examiner* — Omar Abdul-Ali
(74) *Attorney, Agent, or Firm* — Michael J. Andri

(57) ABSTRACT

A social networking environment supporting collaborative social interaction is disclosed. The social networking environment may be implemented by a computing system including a number of client computing devices and a server system that communicate with each other via a communications network. User profile and geographic location information associated with users of the social networking environment may be shared with each other. Users may request commentary from other users regarding a target user. Users may receive and fulfill requests for commentary to facilitate social interactions between two or more other users. Users may define an inner-circle of users from which commentary may be requested by that user.

20 Claims, 6 Drawing Sheets

INNER-CIRCLE SOCIAL SOURCING

CROSS-REFERENCE TO RELATED APPLICATIONS

The present application is a continuation application of and claims priority to U.S. non-provisional application Ser. No. 13/603,817, titled INNER-CIRCLE SOCIAL SOURCING, filed Sep. 5, 2012, which is a non-provisional application of and claims priority to U.S. provisional application Ser. No. 61/532,387, titled SOCIAL NETWORKING ENVIRONMENT SUPPORTING COLLABORATIVE SOCIAL INTERACTION, filed Sep. 8, 2011, the entire contents of each of these applications are incorporated herein by reference in their entirety for all purposes. Accordingly, the present application claims the benefit of U.S. non-provisional application Ser. No. 13/603,817 and the present application claims the benefit of U.S. provisional application Ser. No. 61/532,387 via U.S. non-provisional application Ser. No. 13/603,817.

BACKGROUND

Social networks allow users to create and manage a user profile, join user groups, and communicate with other users via a computing device, such as a personal computer or mobile device. Mobile devices may augment the social networking experience by enabling the mobile device user to share geographic location information with other users of the social network. Mobile devices having an on-board camera also enable media content in the form of photographs and videos to be captured and shared with other users. Mobile devices supporting augmented reality present users with information overlaying a camera view of a graphical display captured via an on-board camera. These and other features enable further improvement and expansion of the social networking experience for the benefit of its users.

SUMMARY

A social networking environment supporting collaborative social interaction is disclosed. In both real-world and social networking environments, people often desire to meet and establish social connections with other people. The disclosed social networking environment enables a subject user to request and obtain assistance from third party users in the form of commentary and/or introductions with respect to a target user. Third party users may be identified and/or selected from a first group of users that are defined as the subject user's inner-circle of acquaintances, while the target user may be identified and/or selected from a broader group of users existing outside of the inner-circle of acquaintances.

The disclosed social networking environment may be implemented by a computing system having a number of client computing devices each operated by a human user associated with a user identity. A server system may facilitate communications and interactions between the client computing devices via a communications network. Through the assistance of geographic location information shared by users, a subject user may observe that a target user is physically nearby. The subject user may request and receive commentary from and/or introductions by third party users offering assistance to the subject user in order to facilitate social interactions between the subject user and the target user, either physically within the real-world or virtually with the social networking environment.

A graphical user interface including a viewer environment may be provided for the presentation of information to users via their respective client computing device. The viewer environment may include user profile information and/or icons representing the geographic location of users within a displayed map view or augmented reality view. User input may be obtained from a client computing device received via the viewer environment. User input may include commentary provided by a third party user regarding a target user, or communications between one or more of the third party user, target user, and/or subject user in order to facilitate an introduction. The commentary and/or communications may be directed to a subject user as either a private, semi-private, or public message.

DETAILED DESCRIPTION

A social networking environment is disclosed which enables users to (1) request that a third party user provide commentary and/or introduction with respect to a target user; (2) provide commentary and/or introduction to a subject user regarding a target user; (3) engage in a game in which users earn points for providing commentary, introduction, and/or successfully matching or assisting to establish relationships between two or more other users; (4) view a compatibility value between two or more users in the context of an augmented reality camera view or map view with the assistance of geographic location information shared by the users; (5) define a subset of acquaintances within the social networking environment referred to as the user's "inner-circle" of acquaintances that may be relied upon to provide commentary and/or introduction for that user with respect to a target user. Such commentary and/or introduction may take the form of electronic text or voice communications between users within the social networking environment over a communications network.

Figure 1:
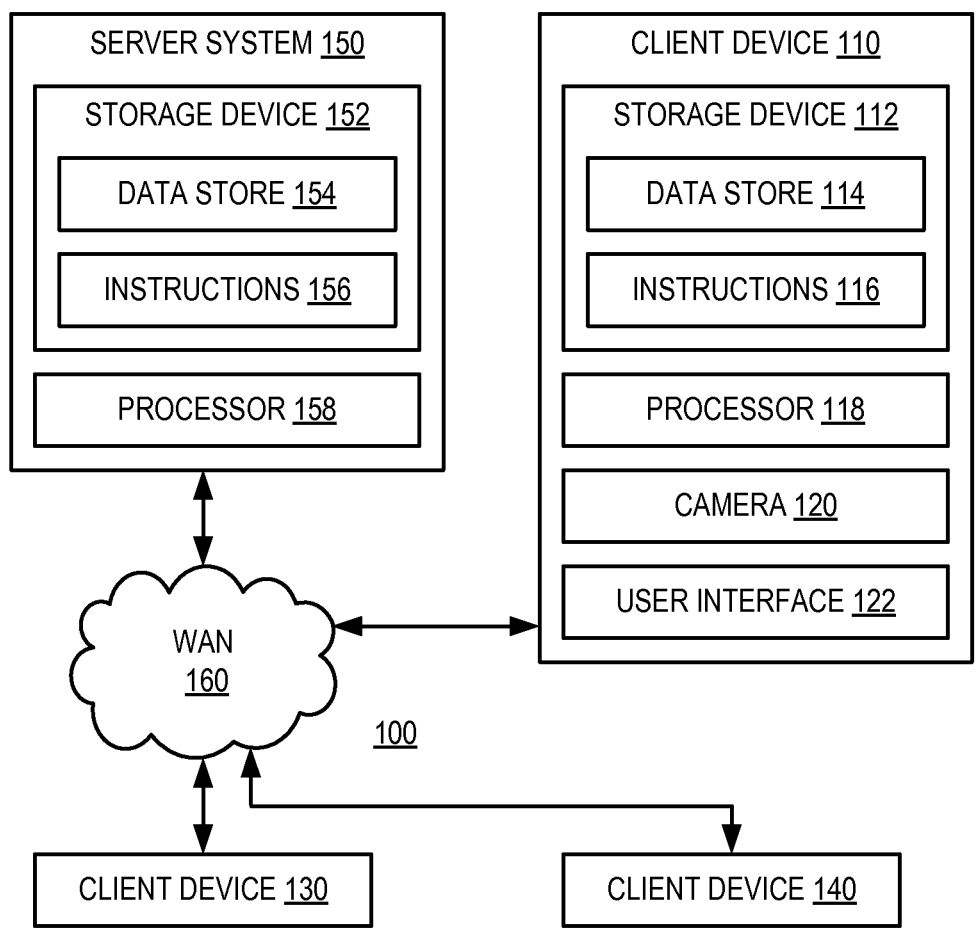
FIG. 1 is a schematic diagram depicting an example computing system according to one embodiment.

The social networking environment may be implemented by a computing system. FIG. 1 is a schematic diagram depicting an example computing system 100 according to one embodiment. Computing system 100 may include a server system 150 and any number of client computing devices 110, 130, 140, etc. that may communicate with each other via a wide area network (WAN) 160 (e.g., the Internet or portion thereof). Detailed aspects of these client computing devices will be further described with reference to example client computing device 110. A user may operate a client computing device to interact with other users within the social networking environment. Within the social networking environment, a user may be represented by a user identity having an associated user profile.

In at least some implementations, client computing device 110 may take the form of a personal computer or a mobile device. Client computing device 110 may include a storage device 112 having a data store 114 and instructions 116 stored thereon. Instructions 116 may include a special purpose application program or general purpose browser program, for example. Client computing device 110 may include a processor 118 for executing instructions 116 to enable the client computing device to provide the functionality and/or perform the methods described herein.

Client computing device 110 may include a camera 120 for capturing a camera view that may be presented to the user via a graphical user interface (GUI) of the client computing device and/or may be stored as an image or video file in data store 114. User interface 122 may include any suitable input devices and/or output devices to enable a user to interact with or otherwise control the operation of client computing device 110. As one example, user interface 122 may include a touch-sensitive graphical display (e.g., a touch screen) that presents graphical content (e.g., a GUI) and enables a user to provide a user input via the graphical display. However, other suitable input and/or output devices may be supported.

Server system 150 may include one or more server devices, which may be generally referred to as computing devices. Server system 150 may include a storage device 152 having data store 154 and instructions 156 stored thereon. Server system 150 may include a processor 158 for executing instructions 156 to enable the server system to provide the functionality and/or perform the methods described herein. Data store 154 may include user identity and/or user profile information for one or more users of the computing system. Server system 150 may associate a particular user and/or client computing device operated by the user with a particular user identity via a user authentication (e.g., sign-in) process, for example. Each account identity may be associated with user profile information. In at least some implementations, server system 150 may obtain user identity and/or user profile information from a remote server device hosting the social networking information, such as via an application programming interface (API) or other suitable programming interface, for example.

Figure 2:
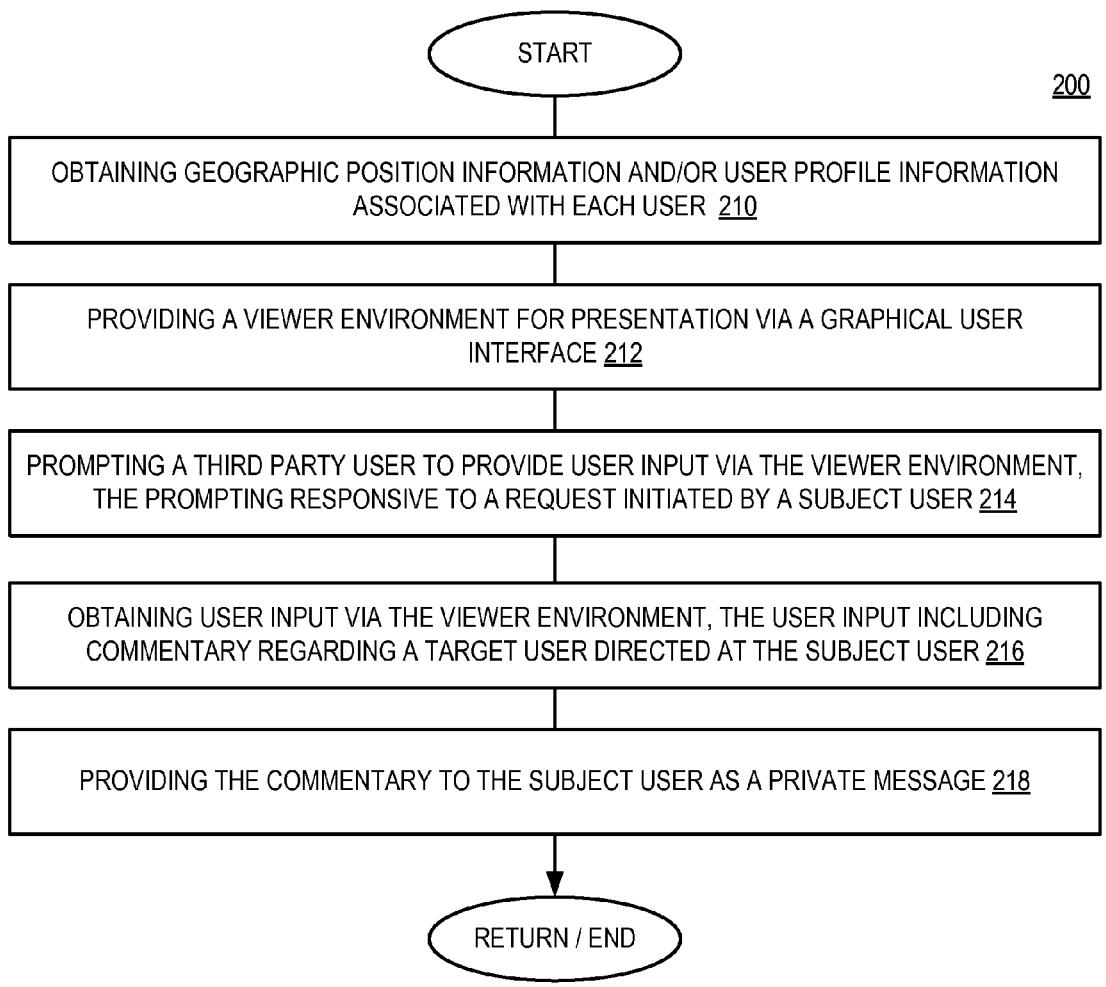
FIG. 2 is a flow diagram depicting an example method for facilitating collaborative social interaction within a social networking environment from the perspective of a server system.

FIG. 2 is a flow diagram depicting an example method 200 for facilitating collaborative social interaction within a social networking environment from the perspective of a server system, such as previously described server system 150. However, it will be understood that method 200 or portions thereof may be performed by or through cooperation with other computing devices other than a server system.

At 210, the method may include obtaining geographic position information and/or user profile information associated with each of a plurality of user identities of corresponding users. As one example, user profile information may include a user name/identifier, a photographic image of the corresponding user, and/or other suitable profile information such as biographical information, user preferences, etc. The user profile information may be associated with a corresponding account identity enabling users to be identified and distinguished from each other.

The user profile information may also indicate relationship information between users within the social networking environment. The relationship information may be represented, for example, as links between user identities within a database structure. In at least some implementations, the user profile information associated with each user identity may be obtained via an application programming interface (API) or other suitable programming interface of a social networking service hosted by a server device. The geographic position information associated with each of the plurality of mobile devices may be received from each of the plurality of mobile devices or from an intermediary computing device (e.g., server device) if respective users of the mobile devices have indicated that the geographic position information of the mobile devices are to be shared with other services. Geographic position information may likewise be obtained via an API or other suitable programming interface of a social networking service hosted by a server device.

At 212, the method may include providing a viewer environment for presentation via a graphical user interface of a computing device. The viewer environment may include the user profile information and/or icons representing a geographic position of each of a plurality of mobile devices associated with user identities based on the received geographic position information. As one example, the viewer environment may include a map view and/or a camera view presented via a mobile device. Icons within the viewer environment may form an augmented reality layer for the map view or camera view, for example. Users may physically navigate to other users within the real-world environment by referencing the viewer environment for the geographic location of such users.

At 214, the method may include prompting a third party user to provide a user input via the viewer environment. As one example, the third party user may be prompted via a message presented via a graphical display of the user's computing device responsive to a request made by a subject user for commentary and/or introduction with respect to a target user. As another example, the third party user may be prompted responsive to the subject user coming within a threshold geographic proximity to the target user. A prompt may be presented to the third party user that indicates the target user identity and/or subject user identity, including associated profile information and/or geographic location information for the target and/or subject users. As yet another example, the third party user may define or otherwise select one or more of the target user identity and/or subject user identity with or without prompting.

In at least some implementations, for each subject user, one or more third party users and/or one or more target users may be identified by the server system based on relationship status between the subject user, third party user, and/or target user existing within the social networking environment. As one example, a first set of users of a social networking environment having a first relationship status type relative to a subject user may be identified. The third party user may be selected from the first set of users. The first set of users may define an inner-circle of social acquaintances established by the subject user, for example. However, other relationships status types may be used to distinguish users. A second set of users of the social networking environment having a second relationship status type relative to the subject user may be identified. The second relationship status type may take the form of users with which the subject user is not acquainted or has not yet established a direct relationship link within the social networking environment.

At 216, the method may include obtaining user input from the third party user via the viewer environment concerning one or more of the target user and/or subject user. The user input may include commentary by the third party user regarding the target user. The user input may indicate the subject user identity that is to receive the commentary. The commentary may include communications between the third party user, and one or more of the target user and subject user. Such communications may facilitate an introduction of the subject user to the target user, or may enable the subject user and/or target user to determine whether to communicate with each other.

At 218, the method may include providing commentary and/or communications to the mobile device of the subject user as a private, semi-private, or public message. A private message includes communications that may be accessed or read only by the sender and receiver. A semi-private message includes communications that may be accessed or read only by a defined group or subset of users, including the sender, receiver, and other designated users. A public message includes communications that may be accessed or read by any user. The message may identify the third party user, the target user, and/or the subject user to enable proper addressing of messages to the appropriate client computing device and to provide an indication to users of the sender and receiver of the message, or the subject of commentary or introduction. In at least some implementations, providing commentary or other communications to a mobile device of a user for presentation may include posting the commentary or communications to a user profile associated with the user via an API or other suitable programming interface of a social networking service. The user may access the commentary or communications by retrieving or otherwise receiving the commentary or communications from the social networking service at their respective computing device.

In at least some implementations, obtaining user input via the viewer environment at 216 may include: receiving a first selection at an icon or other suitable selector representing the target user, and receiving a second selection at an icon or other suitable selector representing the subject user. One or more of the first selection and/or the second selection may be received via a touch-sensitive display or other suitable input device. A link may be created between users or associated user identities responsive to a touch gesture dragging at least one of the first icon/selector or second icon/selector towards the other of the first icon/selector and second icon/selector. For example, the commentary at 218 may include or indicate the link created between the target user and the subject user.

In at least some implementations, the method may further include updating a value associated with the third party user responsive to the commentary or communications being provided by that user, for example, via user input. The value may represent a score or points of a game, for example. Users may be encouraged to provide commentary or communications in order to receive points or obtain a better score within the game. In this way, third party users may be benefited by engaging in collaborative social interactions with other users.

In at least some implementations, the method may further include providing relationship information for at least one pair of users based on a comparison of the user profile information associated with each user. For example, the relationship information presented to users via the viewer environment may indicate a compatibility score between any two users based on their respective profile information. For example, a subject user may view the compatibility score of other users located within a geographic proximity to the subject user. Alternatively or additionally, the relationship information may include the identity of other users through which any two users are connected within the social networking environment. For example, a subject user may view third party users that establish a social connection between the subject user and a target user. The third party users presented in this way may be selected by the subject user to provide commentary and/or introductions with respect to the target user.

Figure 3:
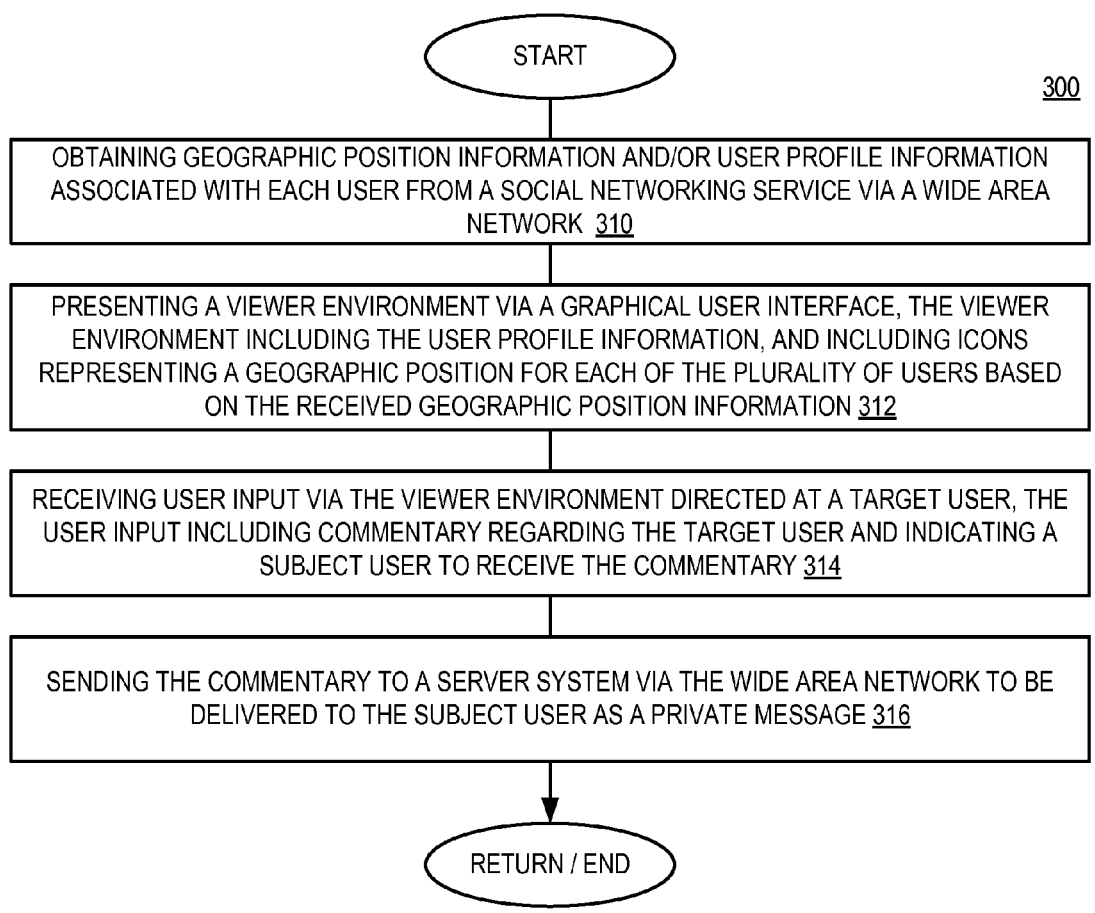
FIG. 3 is a flow diagram depicting an example method for facilitating collaborative social interaction within a social networking environment from the perspective of a client computing device operated by a third party user.

FIG. 3 is a flow diagram depicting an example method 300 for facilitating collaborative social interaction within a social networking environment from the perspective of a client computing device operated by a third party user. However, it will be understood that method 300 or portions thereof may be performed by or through cooperation with other computing devices other than a client computing device operated by the third party user.

At 310, the method may include obtaining geographic position information and/or user profile information associated with each of a plurality of user identities from a social networking service via a wide area network. As one example, a client computing device of the third party user may obtain the geographic information and/or user profile information from a server system via an API or other suitable programming interface of the social networking service.

At 312, the method may include presenting a viewer environment via a graphical user interface of the client computing device of the third party user. The viewer environment may include the user profile information and/or icons representing a geographic position for a number of users based on the received geographic position information.

At 314, the method may include receiving a user input via the viewer environment regarding a target user. The user input may include commentary or other suitable communications regarding the target mobile device user, and may indicate a destination mobile device user of the plurality of mobile devices to receive the commentary, such as a subject user or the target user, for example.

At 316, the method may include sending the commentary or communications to the indicated subject user or target user. The commentary or communications may be transmitted via the social networking service over the wide area network. The social networking service may associate the commentary or communications with the user profile information of the indicated subject user or target user as a private, semi-private, or public message.

In at least some implementations, the viewer environment presented via a graphical user interface of a client computing device may include one or more of: a map viewing window and/or an augmented reality viewing window; a plurality of icons representing a geographic position for each of a plurality of mobile devices; a user profile information field associated with each of the plurality of icons; and/or a selector for directing commentary or communications regarding a target user to a subject user.

Figure 4:
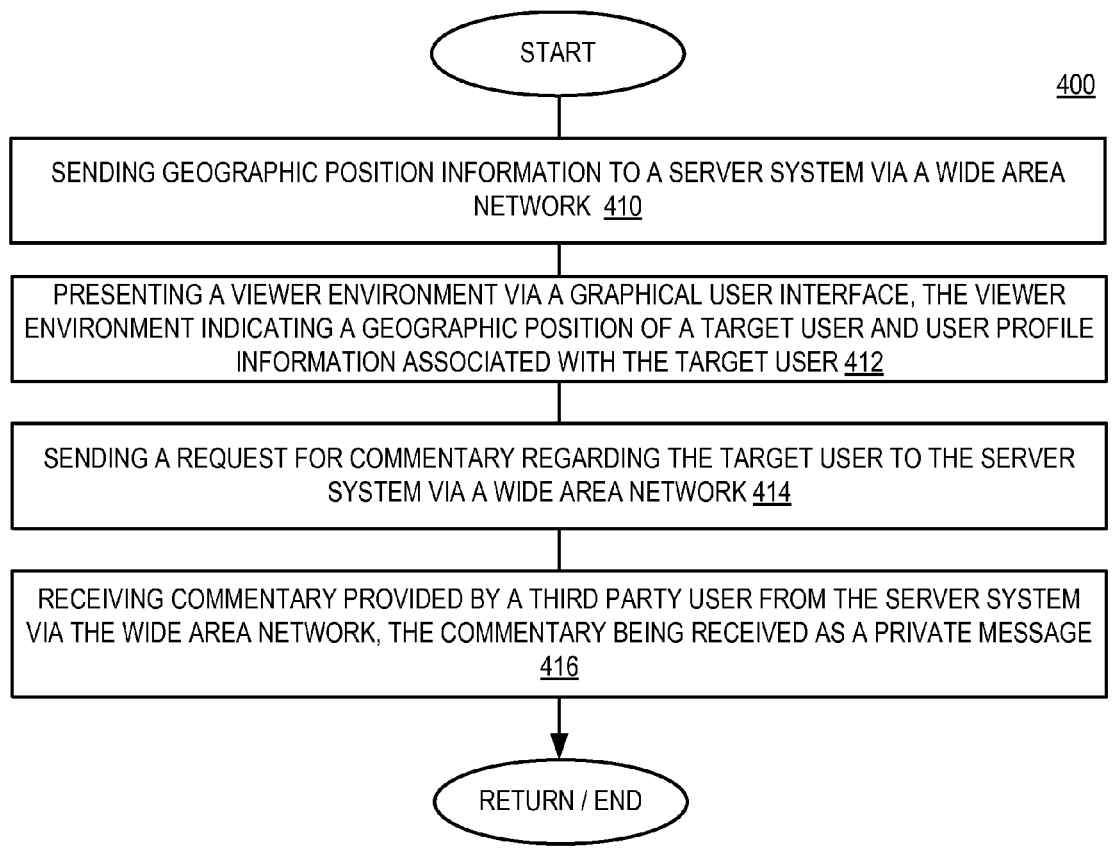
FIG. 4 is a flow diagram depicting an example method for facilitating collaborative social interaction within a social networking environment from the perspective of a client computing device operated by a subject user.

FIG. 4 is a flow diagram depicting an example method 400 for facilitating collaborative social interaction within a social networking environment from the perspective of a client computing device operated by a subject user. However, it will be understood that method 400 or portions thereof may be performed by or through cooperation with other computing devices other than a client computing device operated by the subject user.

At 410, the method may include sending geographic position information to a social networking service via a wide area network. As one example, the social networking service may be hosted at a server system, and may receive the geographic position information via an API or other suitable programming interface. The geographic position information and/or user profile information of the subject user may be forwarded to other users by the server system, which may utilize the information as previously described with regards to method 300, for example. Additionally, the subject user may obtain geographic location information and/or user profile information for other users (e.g., one or more target users) located, for example, within a particular geographic proximity to the subject user.

At 412, the method may include presenting a viewer environment via a graphical user interface of subject user's mobile device. The viewer environment may indicate a geographic position of one or more of the target user and/or third party user, the user profile information associated with the target user and/or third party user, in addition to the commentary or communications provided by the third party user. The commentary or communications may aid the subject user in establishing a relationship or interaction with the target user, either in real-life or within the social networking environment.

At 414, the method may include sending a request for commentary or other communications to the social networking service via the wide area network. The request for commentary or communications may be initiated by the subject user via the user's client computing device (e.g., a mobile device). In at least some implementations, the request for commentary may indicate one or more other third party users that are invited to provide commentary or initiate communications, and/or may indicate one or more target users for which the commentary is requested or to which communications may be directed by the third party user (e.g., to initiate introductions). For example, a user may utilize manipulation/gesturing within an augmented reality or map view of a mobile device to request or provide commentary on another user, such as by dragging two user icons together.

The social networking service may forward the request for commentary or communications to one or more third party users, which may fulfill the request. The third party users to receive the request may be defined or selected by the subject user or by the social networking service using an automated process. For example, requests may be sent to a subset of users having a pre-existing relationship with the subject user. As one example, the third party users that are sent requests may be defined to include users having a relationship link between (e.g., linking) the subject user and the target user of a certain type. As previously discussed, a third party user may be within the inner-circle of the subject user. A third party user may additionally be required to have at least a threshold relationship type established with the target user. For example, a third party user may be required to be both within the inner-circle of or otherwise be a friend type acquaintance with the subject user and be a friend type acquaintance of the target user. However, other suitable filtering criteria may be applied to third party users.

At 416, the method may include, in response to the request for commentary or other suitable communications, receiving the commentary or communications provided by the third party user. The commentary or communications may be received as a private, semi-private, or public message addressed to the mobile device of the subject user. The commentary or communications may identify the target user which the commentary or communications concerns. Alternatively or additionally, commentary or communications provided by the third party user may be directed to the target user, for example, to facilitate an introduction between the subject user and target user.

In at least some implementations, the viewer environment presented via a GUI of the subject user's mobile device may include one or more of: a map view window and/or a camera view window having an augmented reality layer; a selector to enable a user to initiate a request for commentary or communications from a third party user of a remote computing device; a plurality of icons representing a geographic position of other users (including a target user); and/or a field to display commentary or communications received from the remote computing device for the target mobile computing device as a private message responsive to the request for commentary.

Figure 5:
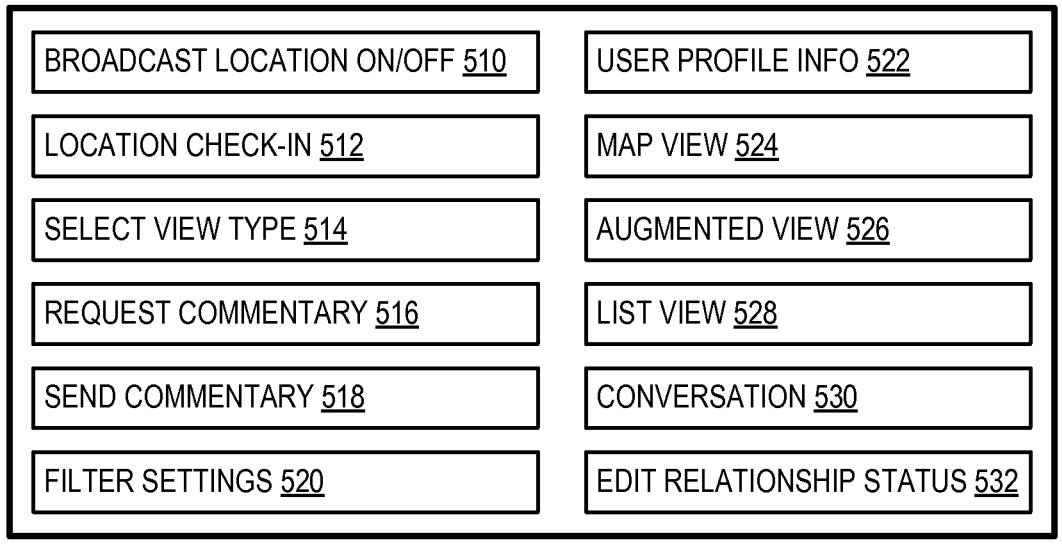
FIG. 5 is a schematic diagram depicting an example graphical user interface according to one embodiment.

FIG. 5 is a schematic diagram depicting an example GUI that may be presented by a computing device used, for example, to implement one or more of the previously described methods. The GUI of FIG. 5 includes a broadcast location selector or tool 510 for controlling whether the computing device broadcasts its geographic location to other users and/or computing devices within the social networking environment. The GUI of FIG. 5 includes a location check-in selector or tool enabling a user to provide an indication of his or her geographic location in the form of the user's reported presence at a particular venue, such as a restaurant, bar, point of interest, etc. The GUI of FIG. 5 includes a view type selector or tool 514 enabling a user to select between or among a map view 524, augmented reality camera view 526, and a list view 528 that may be presented to the user by the computing device. The GUI of FIG. 5 includes a request commentary selector or tool 516 enabling a subject user to request that a third party user provide commentary and/or facilitate an introduction with respect to a target user. The GUI of FIG. 5 includes a send commentary selector or tool 518 that enables a third party user to send commentary regarding a target user to a subject user. The GUI of FIG. 5 includes a filter settings selector or tool 520 that enables a user to apply filter criteria and/or search for users within the social networking environment. The GUI of FIG. 5 further includes user profile information view 522 in addition to map view 524, augmented view 526, and list view 528. The GUI of FIG. 5 includes a conversation view 530 that enables a user to communicate with another user, such as to view, send, and/or receive commentary. Conversation view 530 may present a private, semi-private, or public message, for example. The GUI of FIG. 5 further includes an edit relationship status selector or tool 532 that enables a user to set, define, and edit relationship status information between that user and one or more other users within the social networking environment. For example, a user may define other users as an inner-circle acquaintance, a friend acquaintance that is not within the inner-circle, or a non-friend/non-inner-circle acquaintance. As previously discussed, these relationship status types may be used to identify and select one or more of a subject user, target user, and/or third party user for a given user.

Figure 6:
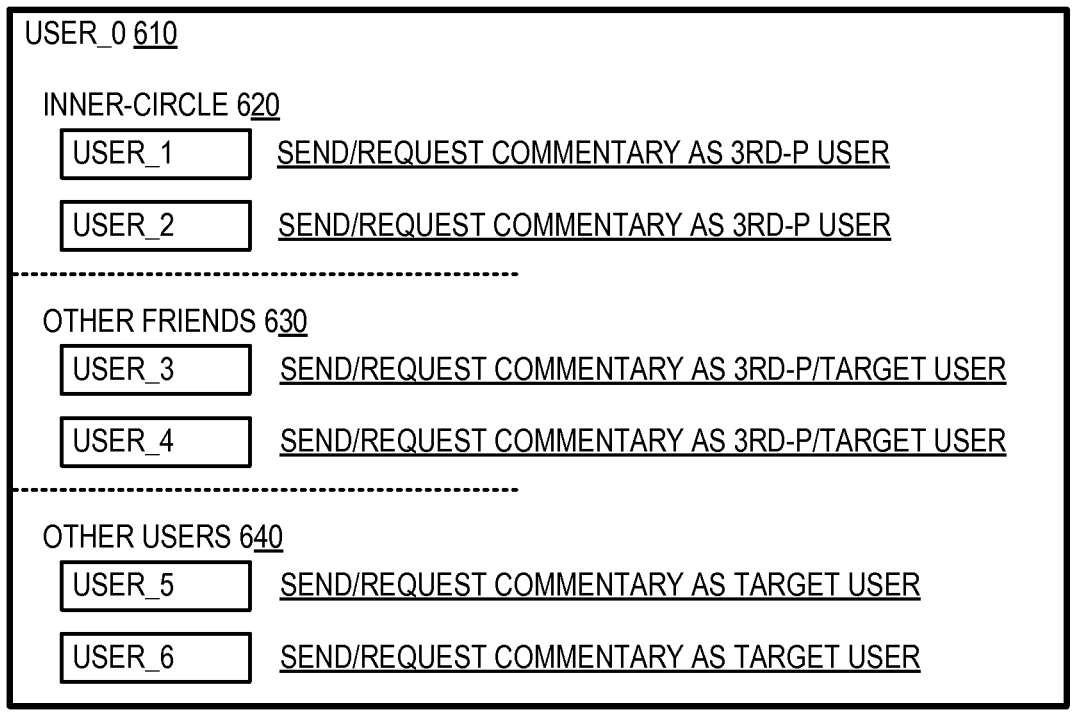
FIG. 6 is a schematic diagram depicting an example graphical user interface taking the form of a list view.

FIG. 6 is a schematic diagram depicting an example graphical user interface taking the form of a list view, such as previously described list view 528. Within the list view of FIG. 6, users may be grouped into relationship status types by a user to represent different types of relationships that a user may have with other users. For example, for a given USER_0 at 610 USER_1 and USER_2 at 620 may be defined as inner-circle acquaintances. USER_0 may further define USER_3 and USER_4 at 630 as non-inner-circle friend acquaintances. USER_0 may further define or otherwise exclude USER_5 and USER_6 at 640 from being grouped as inner-circle acquaintances or non-inner-circle friend acquaintances. In some examples, users may default to a null relationship type or a non-inner-circle/non-friend status prior to a relationship link being directly established by the subject user. It will be understood that a social networking environment may support one, two, three, or more different groupings or categories relationships among its users. For example, inner-circle users may be a subset of friends or other acquaintance types. As another example, inner-circle users may include all friend type acquaintances, but may exclude friends of friends with respect to a given user.

The GUI of FIG. 6 also includes selectors or tools that enable USER_0 to send or request commentary to/from individual users with respect to other users. For example, USER_0 may send commentary to inner-circle users 620 (e.g., USER_1 and USER_2) as a third party user, or USER_0 may request that the inner-circle users provide commentary regarding a target user as third party users to USER_0. As another example, USER_0 may send commentary to other friends 630 (e.g., USER_3 and USER_4) as a third party user, or USER_0 may request that the other friends provide commentary regarding a target user as third party users to USER_0. However, in some examples, only inner-circle users may send or request commentary to/from USER_0. Other friends 630 may additionally or alternatively be target users of commentary sent to or requested from inner-circle users. As yet another example, USER_0 may serve as a third party user to send commentary to a subject user or may serve as a subject user requesting commentary from a third party user in which other users 640 (e.g., USER_5 and USER_6) may be the target user.

Figure 7:
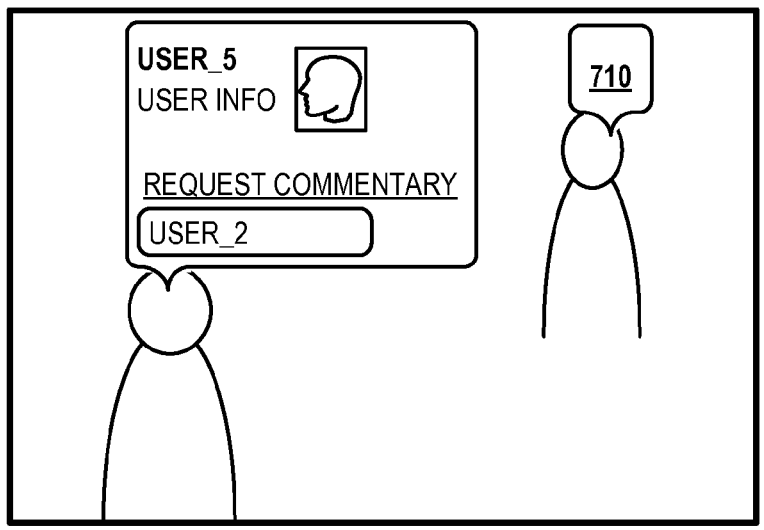
FIGS. 7 and 8 are schematic diagrams depicting example graphical user interfaces taking the form of an augmented reality camera view of a mobile device.
Figure 8:
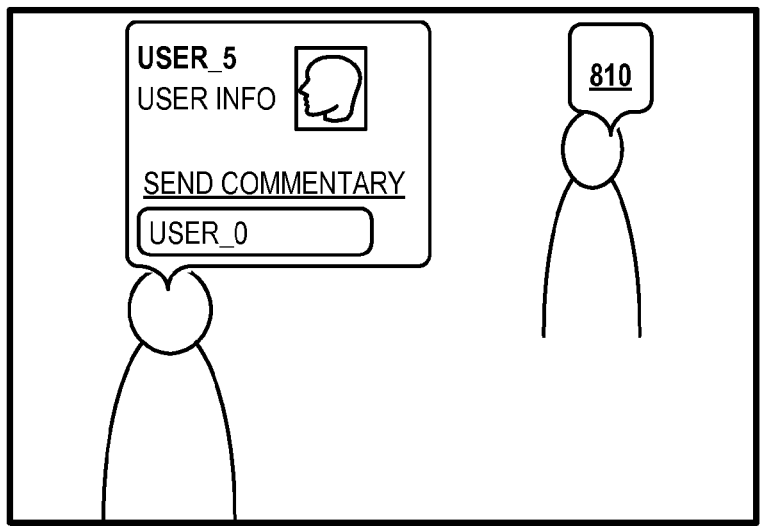

FIGS. 7 and 8 are schematic diagrams depicting example GUIs taking the form of an augmented reality camera view of a mobile device. FIG. 7, for example, includes a GUI as may be viewed by a subject user in which a target user (e.g., USER_5) is visible within a camera view of a mobile device. The GUI of FIG. 7 provides an example where profile information for USER_5 is overlaid upon the camera view. Within the GUI of FIG. 7, a third party user is presented via a graphical display device as an available source of the commentary regarding the target user. A subject user may initiate a request for commentary to a third party user (e.g., USER_2) by directing a user input at a selector of the GUI. For example, a user input provided by the subject user may be used to indicate which third party user of a plurality of available third party users to which the request for commentary is to be directed. Alternatively, if USER_2 is present within the camera view of the GUI, such as indicated at 710, the subject user may initiate the request for commentary by dragging an icon representative of USER_5 toward USER_2, or visa-versa.

FIG. 8. includes an example GUI as may be viewed by a third party user in which a target user (e.g., USER_5) is again visible within a camera view of a mobile device. Within the GUI of FIG. 8, a subject user is presented via a graphical display device as an available destination of the commentary regarding the target user. A third party user may send commentary to the subject user (e.g., USER_0) regarding USER_5 by directing a user input at a selector of the GUI. Alternatively, if USER_0 is present within the camera view of the GUI, such as indicated at 810, the third party user may establish a link used to send commentary by dragging an icon representative of USER_5 toward USER 0, or visa-versa. Commentary that is sent by the third party user may be presented as a layer overlaying a portion of the GUIs of FIGS. 7 and 8, as well as the requests and/or responses to the commentary that are provided by the subject user and/or target user.

Figure 9:
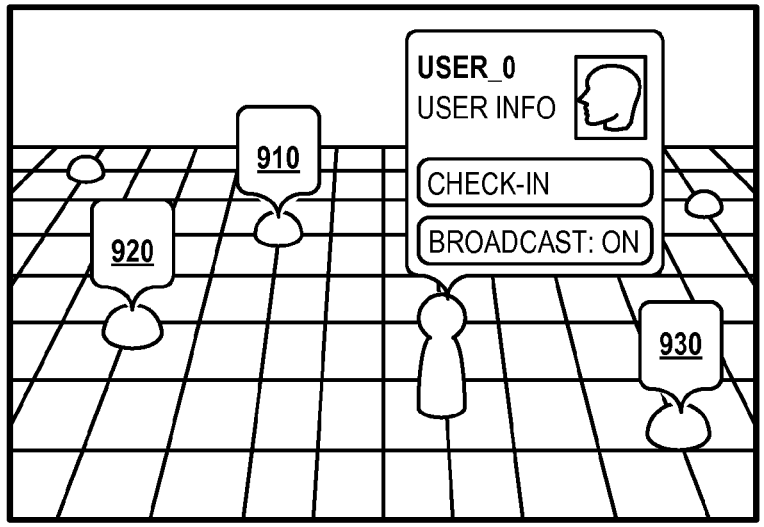
FIG. 9 is a schematic diagram depicting an example graphical user interface taking the form of a map view.

FIG. 9 is a schematic diagram depicting an example GUI taking the form of a map view. Within the GUI of FIG. 9, a geographic position of each user is indicated by a respective icon within the map view. From the perspective of a subject user (e.g., USER_0), the GUI may provide profile information and/or other tools or selectors for each user. For example, a user may check-in or broadcast the user's location. The tools or selectors of FIGS. 6-8 may similarly be presented within the map view. The user may view other users that are located within the map view, including users 910, 920, 930, etc. As one example, user 910 may include a target user, and users 920 and 930 may include third party users that are available to provide commentary to the subject user. The subject user may request commentary by providing a touch gesture received at a touch sensitive display device. The touch gesture may include dragging at least one of a first icon indicating a target user (e.g., 910) or a second icon indicating a third party user (e.g., 920) towards the other of the first icon or the second icon.

Further aspects of the user interfaces, selectors, tools, and user functionality that may be used in combination with the disclosed subject matter are described in U.S. Provisional Patent Application Ser. No. 61/532,387, which has been incorporated herein by reference, including FIGS. 5-15 of the incorporated provisional application.

For example, in FIG. 5 of the incorporated provisional application, touch gestures and control operations may be used, for example, in combination with a touch-sensitive graphical display to control operation of a mobile device. These touch gestures and control operations may be supported by software operating at a mobile device. FIG. 6 of the incorporated provisional application depicts example use cases supported by software operating at a mobile device. A user of a mobile device may select one or more of the use cases, for example, through use of the touch gestures or control operations of FIG. 5 of the incorporated provisional application. FIG. 7 of the incorporated provisional application depicts an example information architecture that may be accessible to users of client computing devices at a server system over a network or through the server system via an API of a third party social networking service.

FIGS. 8-15 of the incorporated provisional application depict example graphical user interfaces that may be presented via a graphical display of a client computing device, along with additional description of the interfaces. FIG. 8 of the incorporated provisional application depicts an example of a map view at a city level abstraction. Element 3 in FIG. 8 of the incorporated provisional application depicts an information field that provides a user with a selector (e.g., Send Scout) to initiate a request to another user to investigate a particular geographic location or region. Element 2 in FIG. 8 of the incorporated provisional application also depicts an information field that provides a user with an activity value and a match value. The activity value may provide an indication of the number of other users are present or nearby the geographic location or region based on geographic location information obtained from their respective mobile devices. The match value may correspond to the previously described compatibility value, which may be based upon a comparison of a user profile of a subject user and the user profile of each other user. The match value and activity value may be calculated or otherwise determined by the server system, a third party social network service, or by the client computing device.

FIGS. 9 and 10 of the incorporated provisional application depict other example map views at a street level abstraction. FIG. 11 of the incorporated provisional application depicts a number of example camera views with augmented reality layers presented over the camera views. Geographic location, proximity, user identifiers, and/or user profile information is presented within at least some of these graphical user interfaces. FIG. 11 of the incorporated provisional application depicts how a subject user may be provided with an information field that provides the identity of a third party user that establishes a relationship link between the subject user and a target user. The information field may also include a selector for enabling the subject user to initiate a request for commentary or other suitable communications from the third party user. The relationship link may be determined by the server system, a third party social networking service, or by the client computing device.

FIG. 12 of the incorporated provisional application shows an example home screen of the viewer environment depicting an example map view. FIG. 13 of the incorporated provisional application shows an example home activity bubble that a user may select from the map view to obtain additional information regarding events or other users present within the map view. FIG. 14 of the incorporated provisional application shows an example of commentary provided by a third party user regarding a target user that may be presented to a subject user via graphical display of a mobile device. FIG. 15 of the incorporated provisional application shows an example graphical user interface including user profile information.

It will be understood that the functionality, methods, operations, or processes described herein may be implemented within a computing system as instructions executable by one or more computer processors. Such instructions may be stored at and may be distributed across one or more storage devices of the computing system. For example, an application program may be executed by a mobile device in coordination with software executed by a remote server device to provide the functionality described herein with reference to methods 200, 300, and 400.

The various configurations and/or techniques described herein are exemplary in nature. Disclosed implementations, embodiments, or examples are not to be considered in a limiting sense, because numerous variations are possible. The methods and/or processes described herein may represent one or more of any suitable number of processing strategies. The various methods and/or processes that have been described and/or depicted may be performed in the disclosed sequence, in other sequences, in parallel, or in some cases omitted. The subject matter of the present disclosure includes all novel and non-obvious combinations and sub-combinations of the various configurations and techniques, and other features, functions, acts, and/or properties disclosed herein, as well as any and all equivalents thereof.

The invention claimed is:

1. A method performed by a server system, the method comprising:
   receiving geographic position information of a plurality of mobile devices;
   identifying, for the plurality of mobile devices, a first set of users of a social networking environment having a first relationship status type relative to a subject user within the social networking environment, the first set of users defining an inner-circle of social acquaintances of the subject user;
   identifying, for the plurality of mobile devices, a second set of users of the social networking environment having a second relationship status type relative to the subject user within the social networking environment;
   providing, via a wide area network, a viewer environment to a computing device of the subject user for presentation via a graphical user interface of the computing device, the viewer environment including respective icons representing a geographic position of each mobile device of the plurality of mobile devices based on the geographic position information, each icon indicating a user of that mobile device as having either the first relationship type or the second relationship type;
   receiving, via a wide area network, user input from the computing device of the subject user, the user input being directed at the viewer environment by the subject user to indicate a target user of a mobile device of the plurality of mobile devices, the target user being of the second set of users having the second relationship type;
   sending, via the wide area network, a request for commentary regarding the target user to a mobile device of the plurality of mobile devices of a third party user of the first set of users having the first relationship type, the request for commentary indicating the target user for which commentary has been requested and the subject user that initiated the request for commentary;
   receiving, via the wide area network, commentary regarding the target user from the mobile device of the third party user; and
   sending, via the wide area network, the commentary regarding the target user to the computing device of the subject user as a private message.

2. The method of claim 1, wherein providing the viewer environment to the computing device of the subject user includes providing the viewer environment as a map view with the icons forming an augmented reality layer for the map view.

3. The method of claim 1, wherein providing the viewer environment to the computing device of the subject user includes providing the viewer environment as a camera view of the computing device with the icons forming an augmented reality layer for the camera view.

4. The method of claim 1, wherein the third party user further has the first relationship status type relative to the target user within the social networking environment such that the target user is a member of the inner-circle of social acquaintances of the third party user.

5. The method of claim 4, wherein the first relationship status type refers to a friend relationship status type.

6. The method of claim 5, wherein the second relationship status type refers to a non-friend or a friend of a friend relationship status type.

7. The method of claim 4, wherein the first relationship status type refers to a subset of a friend relationship status type.

8. The method of claim 7, wherein the second relationship status type refers to a friend, a non-friend, or a friend of a friend relationship status type.

9. The method of claim 1, wherein the user input being directed at the viewer environment by the subject user further indicates the third party user.

10. The method of claim 9, wherein the user input includes dragging at least one of an icon representing a geographic position of the mobile device of the target user and/or an icon representing a geographic position of the mobile device of the third party user towards each other within the viewer environment.

11. The method of claim 1, further comprising:
    selecting the third party user from among the first set of users on behalf of the subject user.

12. A method performed by a server system, the method comprising:
    receiving geographic position information of a plurality of mobile devices;
    identifying, for the plurality of mobile devices, a first set of users of a social networking environment having a first relationship status type relative to a third party user within the social networking environment;

providing, via a wide area network, a viewer environment to a computing device of the third party user for presentation via a graphical user interface of the computing device, the viewer environment including respective icons representing a geographic position of each mobile device of the plurality of mobile devices based on the geographic position information, each icon indicating a user of that mobile device as having either the first relationship type or a second relationship type;

receiving, via a wide area network, user input from the computing device of the third party user, the user input being directed at the viewer environment by the third party user to indicate a target user of a mobile device of the plurality of mobile devices of the first set of users having the first relationship type, and to indicate a subject user of a mobile device of the plurality of mobile devices of the first set of users in which the subject user and the target user further have the second relationship type relative to each other;

receiving, via the wide area network, commentary regarding the target user from the computing device of the third party user; and sending, via the wide area network, the commentary regarding the target user to the mobile device of the subject user as a private message.

13. The method of claim 12, wherein providing the viewer environment to the computing device of the third party user includes providing the viewer environment as a map view with the icons forming an augmented reality layer for the map view.

14. The method of claim 12, wherein providing the viewer environment to the computing device of the third party user includes providing the viewer environment as a camera view of the computing device with the icons forming an augmented reality layer for the camera view.

15. The method of claim 12, further comprising:
identifying one or more users, including the target user, the of the plurality of mobile devices having the second relationship status type relative to the subject user within the social networking environment.

16. The method of claim 12, wherein the first relationship status type refers to a friend relationship status type; and wherein the second relationship status type refers to a non-friend or a friend of a friend relationship status type.

17. The method of claim 12, wherein the first relationship status type refers to a subset of a friend relationship status type.

18. The method of claim 17, wherein the second relationship status type refers to a friend, a non-friend, or a friend of a friend relationship status type.

19. The method of claim 12, wherein the user input includes dragging at least one of an icon representing a geographic position of the mobile device of the target user and/or an icon representing a geographic position of the mobile device of the subject user towards each other within the viewer environment.

20. A server system, comprising:
one or more server devices having instructions stored thereon executable by the one or more server devices to:

receive geographic position information of a plurality of mobile devices;

identify, for the plurality of mobile devices, a first set of users of a social networking environment having a first relationship status type relative to a subject user within the social networking environment, the first set of users defining an inner-circle of social acquaintances of the subject user;

identify, for the plurality of mobile devices, a second set of users of the social networking environment having a second relationship status type relative to the subject user within the social networking environment;

provide, via a wide area network, a viewer environment to a computing device of the subject user for presentation via a graphical user interface of the computing device, the viewer environment including respective icons representing a geographic position of each mobile device of the plurality of mobile devices based on the geographic position information, each icon indicating a user of that mobile device as having either the first relationship type or the second relationship type;

receive, via a wide area network, user input from the computing device of the subject user, the user input being directed at the viewer environment by the subject user to indicate a target user of a mobile device of the plurality of mobile devices, the target user being of the second set of users having the second relationship type;

send, via the wide area network, a request for commentary regarding the target user to a mobile device of the plurality of mobile devices of a third party user of the first set of users having the first relationship type, the request for commentary indicating the target user for which commentary has been requested and the subject user that initiated the request for commentary, the third party user further having the first relationship status type relative to the target user within the social networking environment such that the target user is a member of the inner-circle of social acquaintances of the third party user;

receive, via the wide area network, commentary regarding the target user from the mobile device of the third party user; and send, via the wide area network, the commentary regarding the target user to the computing device of the subject user as a private message.

* * * * *